United States Patent
Spresny

(10) Patent No.: US 6,926,338 B2
(45) Date of Patent: Aug. 9, 2005

(54) TRUNKLID FOR A CONVERTIBLE VEHICLE

(75) Inventor: Lars Spresny, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/851,629

(22) Filed: May 22, 2004

(65) Prior Publication Data

US 2004/0212214 A1 Oct. 28, 2004

Related U.S. Application Data

(63) Continuation-in-part of application No. PCT/EP03/02810, filed on Mar. 18, 2003.

(30) Foreign Application Priority Data

Apr. 4, 2002 (DE) .......................................... 102 14 980

(51) Int. Cl.[7] ................................................. B60J 7/20
(52) U.S. Cl. ............................ 296/136.06; 296/107.08; 296/76
(58) Field of Search ............................. 296/76, 136.01, 296/136.04, 136.05, 136.06, 107.08

(56) References Cited

U.S. PATENT DOCUMENTS 6,824,194 B2 * 11/2004 Weissmueller et al. 296/136.05
2002/0093218 A1 * 7/2002 Weissmueller et al. ..... 296/136
2003/0025350 A1 * 2/2003 Sande ................... 296/107.08
2003/0218350 A1 * 11/2003 Neubrand ..................... 296/76
2004/0046410 A1 * 3/2004 Wagner ....................... 296/76

FOREIGN PATENT DOCUMENTS

| DE | 44 45 944 | 4/1996 |
| DE | 698 01 601 | 8/1998 |
| DE | 195 16 876 | 11/1998 |
| DE | 199 43 863 | 4/2001 |
| DE | 1 281 553 | 2/2003 |
| EP | 0 949 103 | 10/1999 |
| EP | 1 084 883 | 3/2001 |
| WO | WO 2004/076218 A1 * | 10/2004 |

* cited by examiner

Primary Examiner—Patricia L. Engle
(74) Attorney, Agent, or Firm—Klaus J. Bach

(57) ABSTRACT

In a convertible vehicle with a vehicle body, a rear cover including a support frame supported on the vehicle body pivotally about a first pivot axis, a trunk lid supported on the support frame pivotally about a second pivot axis which is spaced from the first pivot axis, such that, upon opening the rear cover in a first phase of movement, the support frame is pivoted open and in a second phase of movement, the trunk lid is pivoted open on the support frame, all by a single actuating element.

7 Claims, 3 Drawing Sheets

TRUNKLID FOR A CONVERTIBLE VEHICLE

This is a Continuation-In-Part Application of international application PCT/EP03/02810 filed Mar. 18, 2003 and claiming the priority of German application 102 14 980.1 filed Apr. 04, 2002.

BACKGROUND OF THE INVENTION

The invention relates to a trunk lid for a convertible vehicle, including a support frame and a lid pivotally supported on the support frame wherein the support frame is mounted on the vehicle body pivotally about a support axis arranged in spaced relationship from the pivot axis of the lid such that in a first phase of movement the frame is pivoted and in a second phase, the lid is pivoted about its pivot axis on the frame.

DE 195 16 876 C1 discloses a rear vehicle lid, which is movable between a closed position and an open position for a trunk which also accommodates a vehicle roof in the storage position thereof. In order to provide on one hand, a sufficiently large passage for transferring the vehicle roof into the trunk and, on the other hand, to provide uninhibited access to the trunk for the loading and unloading of the vehicle trunk from the rear, the trunk lid is selectively pivotable about a front pivot axis which is adjacent the vehicle interior and a rear pivot axis which is disposed at the rear end of the vehicle. This is achieved by a two-part design of the rear lid which comprises a support frame pivotally connected to the vehicle body and a lid member pivotally mounted on the support frame. For the transfer movement of the vehicle roof between its closed and its storage position, the support frame and the lid which is locked to the support frame are pivoted together about the rear pivot axis by means of a hydraulic operating member. For opening the trunk however, the support frame remains in its closed position on the vehicle body and only the lid is pivoted open relative to the support frame about its pivot axis adjacent the interior vehicle space.

For the storage of the vehicle roof and for opening the trunk, the trunk lid performs different opening movements for which also different operating mechanisms or operating elements are provided. It also must be considered that during the raising of the rear lid at the front edge thereof for depositing or closing the vehicle roof, the rear lid section will not project beyond the rear end of the vehicle in order to avoid collisions with objects behind the vehicle.

De 44 45 944 C1 discloses a hardtop vehicle with a removable vehicle roof which can be deposited in a rear trunk provided with a rear cover comprising a frame which is pivotally supported on the vehicle body and on which a trunk lid is mounted so as to be pivotable thereon. For opening the trunk for loading and unloading and for transferring the vehicle roof into and out of the trunk two hydraulic operating elements are provided. A first hydraulic operating element is supported on the vehicle body and engages the support frame for pivoting the support frame together with the trunk lid relative to the vehicle body and a second operating element is supported on the support frame and engages the trunk lid for pivoting the trunk lid relative to the support frame.

It is the object of the present invention to provide a rear lid support arrangement for a convertible vehicle of simple design which is pivotable about the front and also about the rear end thereof and which remains within the contour of the vehicle at any time during opening or closing of the lid.

SUMMARY OF THE INVENTION

In a convertible vehicle with a body having a rear cover comprising a support frame supported on the vehicle body pivotally about a first pivot axis, a trunk lid supported on the support frame pivotally about a second pivot axis which is spaced from the first pivot axis, such that, upon opening the rear cover in a first phase of movement, the support frame is pivoted open and in a second phase of movement, the trunk lid is pivoted open on the support frame, all by a single actuating element.

The second phase concerning the relative movement of the lid with respect to the support frame can be basically uncoupled from the first phase so that the second phase follows only optionally the first phase and is executed only if it is desired by the driver or another operating person. This division into two phases of movement has the advantage that each phase of movement can be provided for a particular application. It is therefore particularly possible, to open the trunk in the first phase of movement in which the support frame and the lid are jointly raised to open the trunk and, in the second phase, in which the lid is pivoted relative to the support arm to provide a passage for the transfer of the vehicle roof between the closed and the storage positions. Since the second phase of movement follows the first phase for the transfer movement of the vehicle roof for opening the rear lid, no basically different opening movement is needed than for the opening of the trunk lid. Only an additional pivot movement of the lid part relative to the support frame is initiated. The first phase of movement is identical for both opening movements. For this reason, the design can be simplified in comparison with the state of the art.

In a first expedient embodiment, altogether two operating elements, for example, two hydraulic cylinders, are provided, each for one phase of movement. A first operating element is supported on the vehicle body and actuates the support arm; the second operating element is disposed between the support arm and the lid for pivoting the lid relative to the support arm. The two operating elements can be controlled independently of each other. Each operating element can be adapted to the respective design conditions in an optimal way.

In a second expedient embodiment, the support frame and the lid part are operable by a common actuating element. In this embodiment, the two movement phases of the rear cover are assigned to different operating sections of the operating part of the actuating element. This embodiment can be supported in that the operating part is connected to the cover element. In order to make sure that in the first phase of movement both components of the rear cover, that is, the support frame and the lid, are both raised concurrently, it is advantageous to provide at a distance from the pivot axis of the lid part a releasable locking mechanism for locking the lid part to the support frame. For the execution of the second phase of movement, the locking mechanism is released so that the lid part can be pivoted open with respect to the support frame. In the embodiment with only one actuating element, the actuating element is directly connected to the lid part to raise it relative to the support frame.

In order to support the opening movement, a passive spring element may be provided which biases the rear cover in the opening direction. The spring element, for example a gas spring, facilitates the opening of the trunk also upon failure of the actuating element.

Further advantages and expedient embodiments of the invention will become apparent from the following description on the basis of the accompanying drawings.

DESCRIPTION OF PREFERRED EMBODIMENTS

Figure 1:
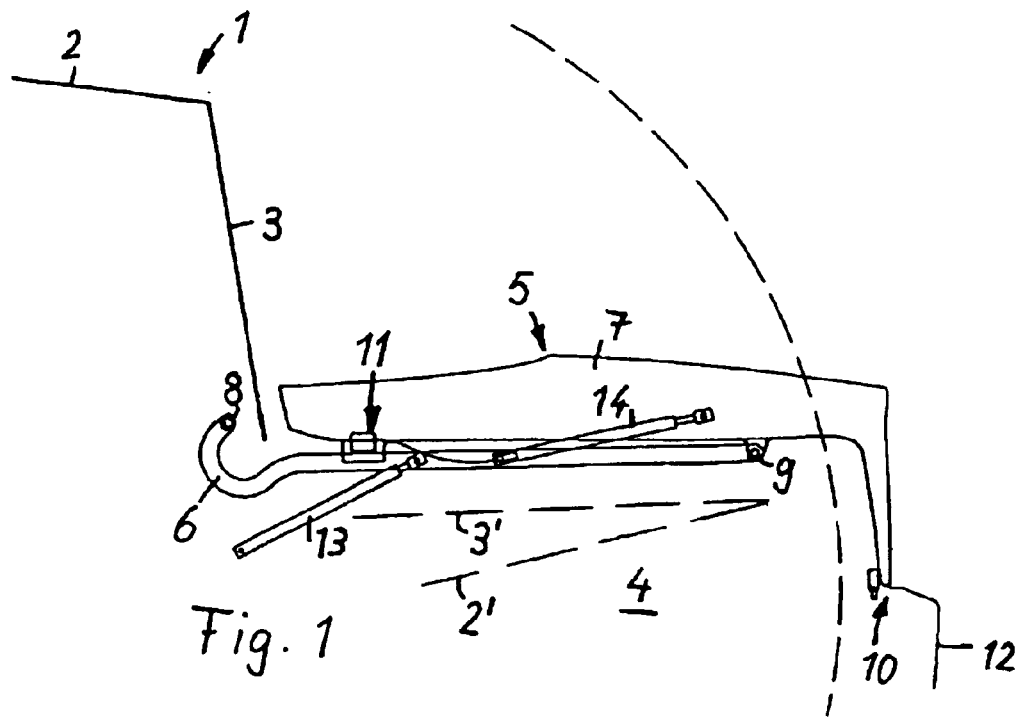
FIG. 1 shows a closed rear trunk cover with a support frame or arm and a lid part for a convertible vehicle in a side view.

Below identical components are designated by the same reference numerals.

The vehicle roof 1 shown in FIG. 1 is a removable roof of a convertible vehicle which may be for example in the form of a hardtop including two roof parts 2 and 3. Alternately, it may be in the form of a soft top. The vehicle roof 1 including the roof parts 2 and 3 is movable between a closed position as shown in full lines in which it covers the interior of a vehicle and a storage position which is indicated by the numerals 2' and 3' in which the roof parts are deposited in the trunk 4 of the vehicle. The trunk 4 is closed by a rear trunk cover 5, which comprises two parts that is a support frame 6 and a trunk lid 7. The support frame 6 is pivotally supported on the vehicle body by way of a pivot joint 8, which is disposed at the front end of the rear cover adjacent the vehicle interior or the closed vehicle roof 1. The trunk lid 7 is supported on the support frame 6 by another pivot joint 9 disposed adjacent the rear end of the vehicle and in spaced relationship to the pivot joint 8. The trunk lid 7 is locked to the vehicle body 12 by a first locking mechanism 10, which is disposed in the closed position of the lid 7 at a downwardly extending rear end portion of the trunk lid 7. The trunk lid is also locked to the support frame 6 by a second locking mechanism 11. Both locking mechanisms 10 and 11 are releasable.

In addition, there are two active actuation elements 13 and 14 one for pivoting the support frame 6 upwardly about its pivot joint 8 or, respectively, the trunk lid 7 about its pivot joint 9. The first actuating element 13' is supported on the vehicle body and engages the pivot arm 6 at a distance from the pivot joint 8 thereof. The second actuating element 14 is arranged between the support frame 6 and the trunk lid 7, wherein the coupling point of the actuating element 14 with the two components are disposed at a distance from the pivot joint 9. Both actuating elements are expediently hydraulically operable.

Figure 2:
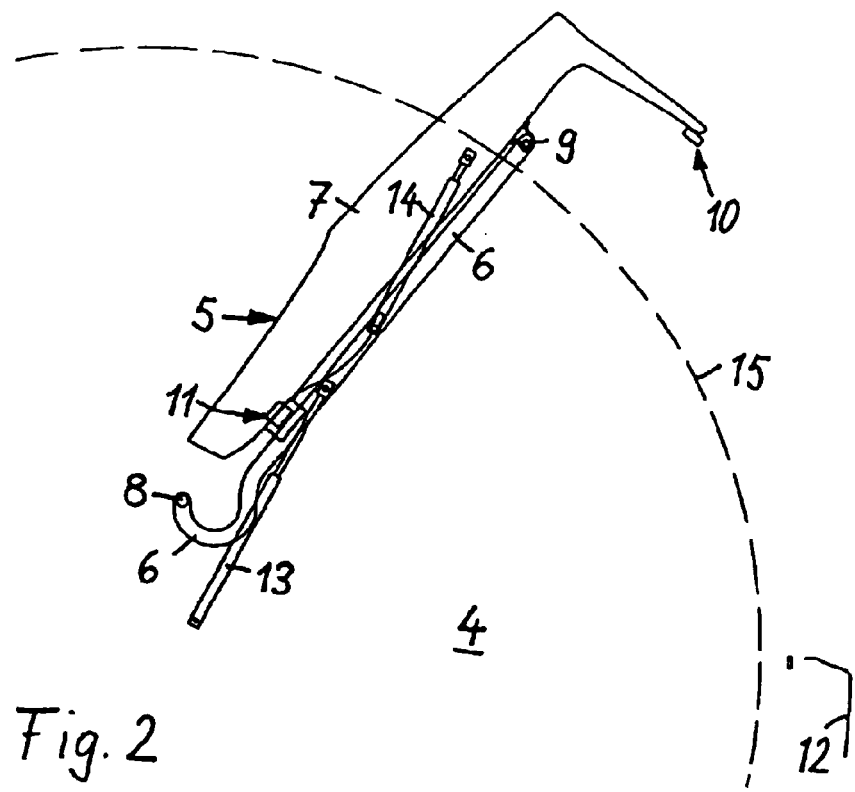
FIG. 2 shows the rear cover in a position in which its rear end is raised during a first phase of movement wherein the lid part is locked to the support frame.

FIG. 2 represents the first phase of movement during opening of the rear cover 5, wherein the support frame 6 and the trunk lid 7 are locked together by way of the locking mechanism 11 and the rear end of the rear cover is raised so that the trunk is opened from the rear end thereof whereby the trunk becomes accessible. Upon actuation of the first actuating element 13' after the rear locking mechanism 10 between the rear section of the trunk lid 7 and the vehicle body is released, the rear cover 5 is pivoted open about the pivot axis of the vehicle body-based pivot joint 8 at the support frame 6 along the path 15 of movement indicated by the dashed line. It is made sure in this connection that the rear cover 5 does not extend beyond the rear end of the vehicle. During the first phase of movement, the locking mechanism 11 remains closed and the second actuating element 14 is not operated.

Figure 3:
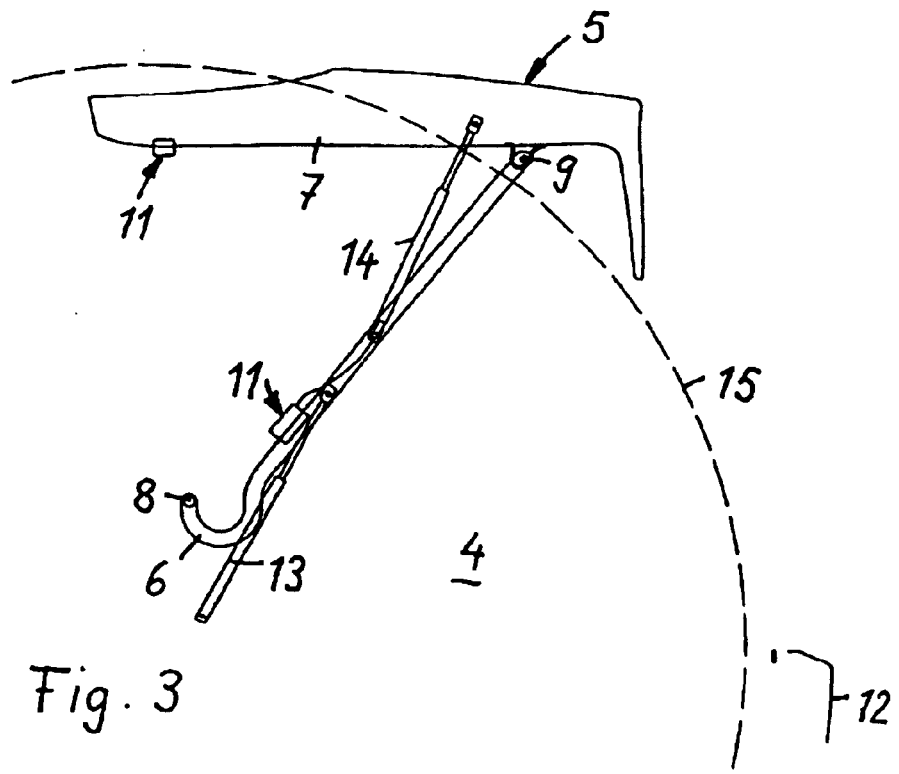
FIG. 3 shows the rear cover in a second phase of movement in which the lid part is released from the support frame and the lid part is pivoted relative to the support frame.

Following the first phase of movement, there may be a second phase of movement which is shown in FIG. 3, and wherein the trunk lid 7 is pivoted open relative to the support frame 6 in order to provide a passage for the transfer of the vehicle roof between its closed and its storage positions into, or out of, the trunk. For executing the second phase of movement, the second locking mechanism 11 between the trunk lid 7 and the support frame 6 is released and the second actuating element 14 is operated. As a result, the trunk lid 7 is pivoted open about the pivot axis of its pivot joint 9 relative to the support frame 6 which remains in its position. Also, in the second phase of movement, the rear cover 5 will not extend beyond the rear end of the vehicle. By pivoting the trunk lid 7 relative to the support frame 6, the front edge of the trunk lid 7 adjacent the vehicle interior is raised whereby a sufficiently large passage area for the transfer of the vehicle roof into the trunk and out of the trunk 4 is provided.

Figure 4:
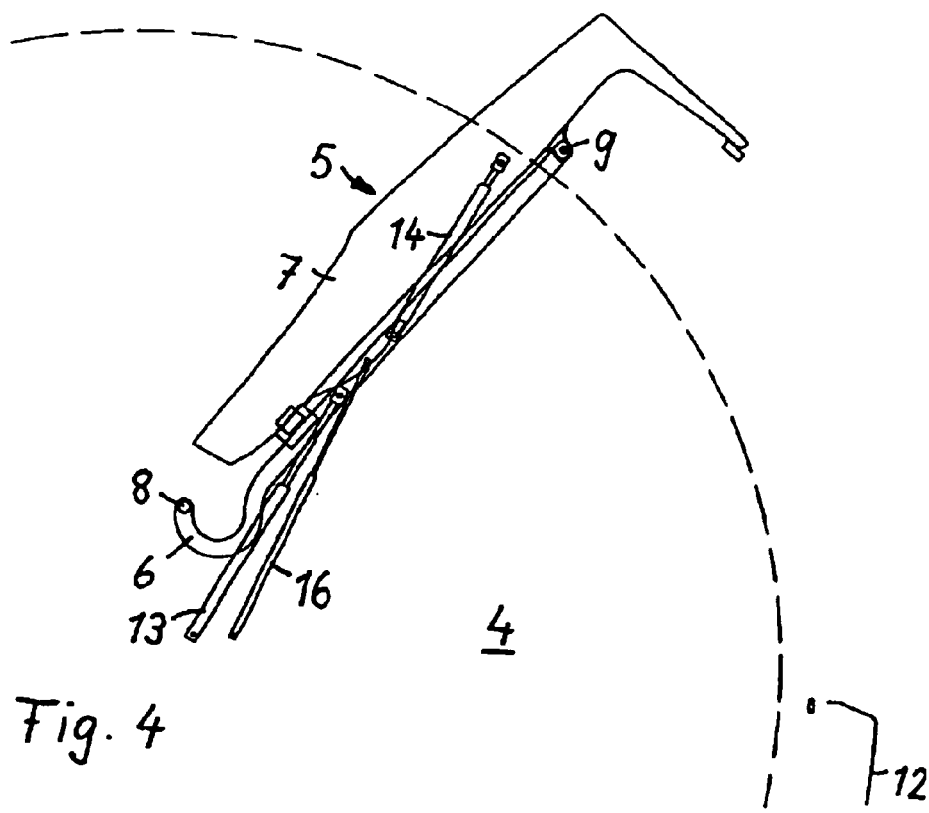
FIG. 4 shows an arrangement of the rear cover corresponding to that of FIG. 2, wherein however additionally a spring element is provided which biases the rear cover into an open position.

The embodiment of the rear cover 5 according to FIG. 4 corresponds essentially to that of the preceding figures, however, with the difference that an additional passive spring element 16 is provided which, with one end thereof is supported on the vehicle body and, with its other end, is pivotally connected to the support frame 6. The spring element 16, which is preferably a gas spring, applies to the support 6 a lifting force in the opening direction of the support frame 6. In this way, the rear cover 5 can be relatively easily opened even when the first active controllable actuating element 13' should fail.

Figure 5:
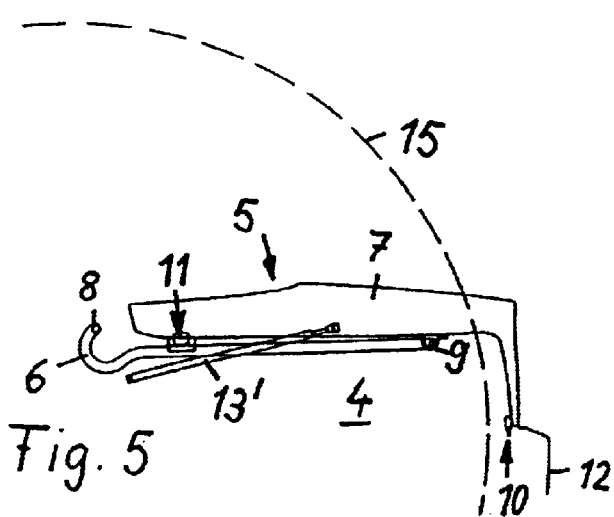
FIG. 5 shows a rear cover with only one actuating element for performing both phases of movement, represented in the closed position.
Figure 6:
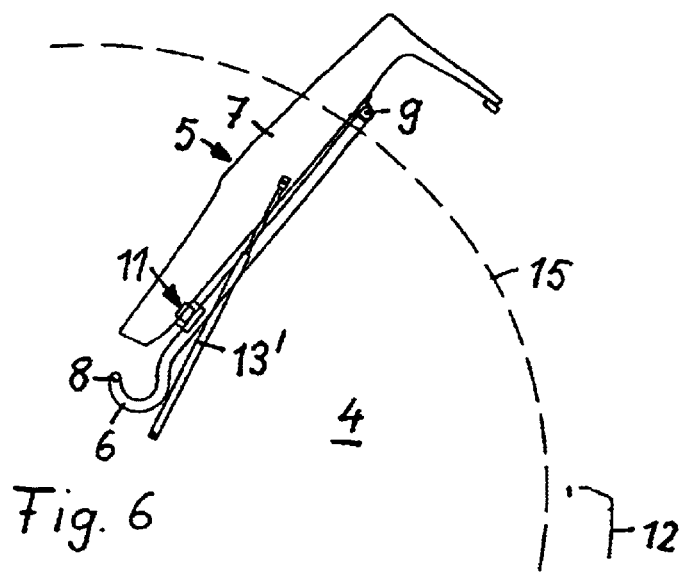
FIG. 6 shows the rear cover in the first phase of movement.
Figure 7:
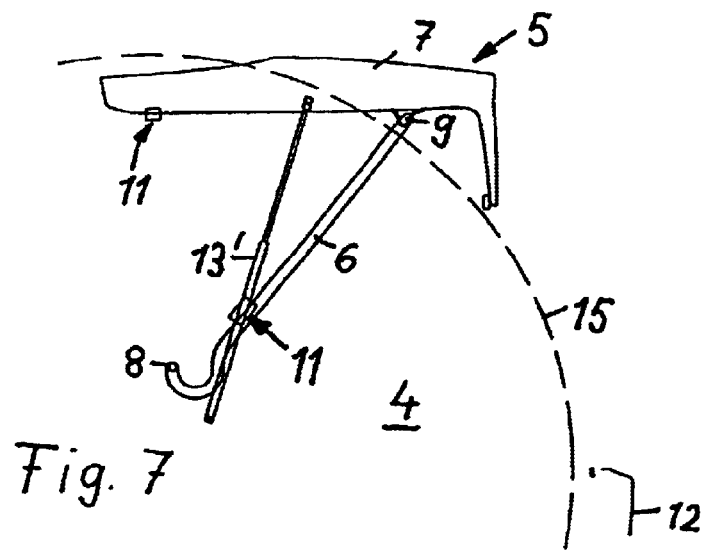
FIG. 7 shows the rear cover in the second phase of movement.

The FIGS. 5–7 show another embodiment for a rear cover 5, which is shown in a closed position, and in FIGS. 6 and 7 after completion of the first phase of movement. Different from the preceding embodiment a single active actuating element 13' is provided with which the first phase of movement as well as the second phase of movement is performed. The actuating element 13' is supported at one end on the vehicle body and is connected with its other end to the trunk lid 7 at a distance from the pivot joint 8 of the support frame 6 with the vehicle body and from the pivot joint 9 of the trunk lid 7 with the support arm 6. Upon operation of the actuating element 13' after releasing the first locking mechanism 10 at the vertically downwardly extending section of the trunk lid 7 in the area of the vehicle body 12, the combination of the support arm 6 and the trunk lid 7 is pivoted open together about the pivot axis of the pivot joint 8. During the first phase of movement, the second locking mechanism 11 between the trunk lid 7 and the support frame 6 remains locked. The first phase of movement for raising the rear cover 5 represents to a first phase of operation of the actuating element 13'.

To initiate the second phase of movement in accordance with FIG. 7, the second locking mechanism 11 is released and the actuating element 13' is operated in a second phase of operation which follows the first phase of operation. In this phase, the trunk lid is pivoted about the pivot axis of the pivot joint 9 relative to the support frame 6 and the front edge of the trunk lid 7 is raised in order to provide sufficient clearance for the passage of the roof into, and out of, the vehicle trunk. In this way, the two different phases of movement of the rear cover can be realized with a single actuating element.

What is claimed is:

1. A rear cover for a convertible vehicle with a vehicle body, comprising a support frame (6) supported on said vehicle body (12) pivotally about a first pivot axis (8), a trunk lid (7) supported on said support frame (6) pivotally about a second pivot axis (9) which is spaced from said first pivot axis such that, for opening the rear cover (5) in a first phase of movement, the support frame (6) with said trunk lid (7) coupled thereto is pivoted open and subsequently, in a second phase of movement, said trunk lid (7) is pivoted uncoupled from the support frame and independently of said first phase of movement, and a single actuating element (13) for actuating said support frame (6) together with said trunk lid in said first phase and, for actuating in said second phase, said trunk lid (7) relative to the support frame.

2. A rear cover for a vehicle according to claim 1, wherein said pivot axis of said trunk lid (7) is disposed on said support frame (6) at the rear end of said vehicle body and the pivot axis of said support frame (6) is arranged on the vehicle body at the front end of said rear cover near an interior space of said vehicle.

3. A rear cover for a vehicle according to claim 1, wherein said actuating element (13) is disposed between said vehicle body and said trunk lid (7).

4. A rear cover for a vehicle according to claim 1, wherein a releasable locking mechanism (11) for interlocking the trunk lid (7) and the support frame (6) is provided on the support frame (6) in spaced relationship with the pivot axis of said trunk lid (7).

5. A rear cover for a vehicle according to claim 4, wherein another releasable locking mechanism (10) for locking the support frame (6) to the vehicle body (12) is provided at a distance from the pivot axis of the support frame (6).

6. A rear cover for a vehicle according to claim 1, wherein a spring element (16) is provided for biasing the rear cover (5) in the opening direction.

7. A rear cover for a vehicle according to claim 6, wherein said spring element (16) is connected between said vehicle body (12) and said support frame (6).

\* \* \* \* \*